March 5, 1968     G. D. DAVIS ET AL     3,372,109
HYDROCARBON SEPARATION WITH AN ALKOXYNITRILE SOLVENT
Filed March 16, 1966
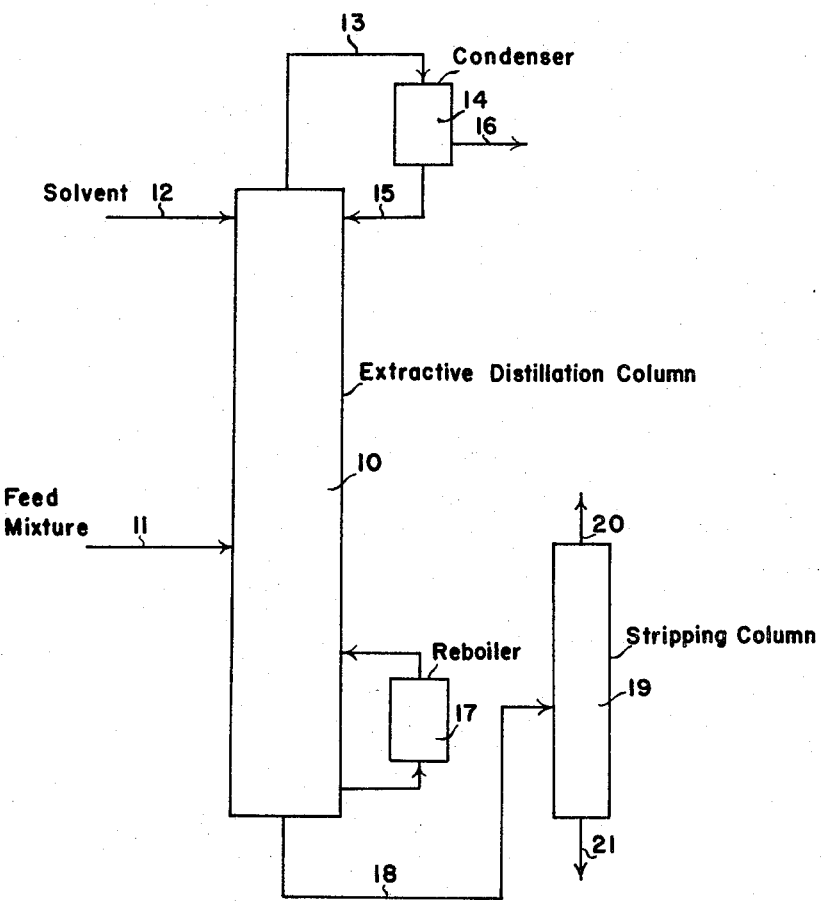
George D. Davis
Earle C. Makin, Jr.
*INVENTORS*
BY *M. N. Cleaves*
ATTORNEY

3,372,109
HYDROCARBON SEPARATION WITH AN
ALKOXYNITRILE SOLVENT
George D. Davis, Creve Coeur, and Earle C. Makin, Jr.,
St. Louis, Mo., assignors to Monsanto Company, St.
Louis, Mo., a corporation of Delaware
Filed Mar. 16, 1966, Ser. No. 534,869
8 Claims. (Cl. 208—313)

ABSTRACT OF THE DISCLOSURE

A process for the separation of mixtures of hydrocarbons of varying degrees of unsaturation by extractively distilling such mixtures in the presence of a solvent which comprises 75 to 99 percent by weight of an alkoxynitrile in which the alkyl radicals are straight chain and have one to three carbon atoms and 1 to 25 percent by weight of water, recovering an overhead distillate fraction from the extractive distillation which is substantially richer in hydrocarbons of lesser degree of unsaturation than the original mixture, removing a solvent fraction rich in the more unsaturated hydrocarbons of the original mixture from the distillation zone and recovering from such solvent fraction a fraction substantially richer in the more unsaturated hydrocarbons than said original mixture.

---

The present invention relates to a process for the separation of hydrocarbons. More particularly, the present invention relates to a process for the separation of mixtures of hydrocarbons of varying degrees of unsaturation by extractive distillation. Specifically, the present invention relates to the separation of hydrocarbon mixtures by the selective removal of the more unsaturated hydrocarbon components therefrom by extractive distillation.

It has long been recognized that many hydrocarbon mixtures are virtually impossible to separate by ordinary distillation methods either because of similarity of boiling point or because of azetrope formation. Among such mixtures are those containing azeotrope forming or similar boiling point hydrocarbons of varying degrees of unsaturation such as mixtures containing butadiene and butylenes. One of the means proposed for overcoming the deficiencies of ordinary distillation for separation of such mixtures is the alteration of the relative volatilities of the components of the mixtures by the addition of a solvent selective for the more unsaturated hydrocarbon components of the mixture. Propably one of the most widely known of such techniques involves the use of furfural alone or with water to separate butadiene and butylenes. However, because of its corrosiveness and its instability furfural alone or with water has not found as wide acceptance as would otherwise be expected.

In the search for solvents to replace furfural in the separation of hydrocarbons of varying degrees of unsaturation, many solvents have been investigated. Some of these, such as dimethylformamide and acetonitrile, have found some prominence. However, literally thousands of chemical compounds and combinations thereof in existence today, as well as many yet unsynthesized, represent potential solvents to replace furfural in the separation of hydrocarbons according to degree of unsaturation. As yet, no acceptable means of predicting effectiveness of a given solvent for a given separation has been found. Further, solvents which are useful under one set of conditions of use as to temperature, pressure, solvent to feed ratios, co-solvents, etc., may not be useful under other such conditions. There is as yet no means for predicting with accuracy the conditions of use for a particular solvent for a given utility. For such reasons, it is quite difficult to find which of the potential solvents are useful for a given separation and the conditions under which such potential solvents will cause the desired separation to occur.

It is an object of the present invention to provide a new and novel extractive distillation process for the separation of hydrocarbon mixtures containing hydrocarbons of varying degrees of unsaturation. Another object of the present invention is to provide a new and novel solvent system for the separation of hydrocarbon mixtures containing hydrocarbons of varying degrees of unsaturation by extractive distillation. It is another object of the present invention to provide a new and improved extractive distillation process and solvents for use therein whereby hydrocarbon mixtures containing hydrocarbons of varying degrees of unsaturation may be separated according to the degree of unsaturation. A particular object of the present invention is to provide a new and improved extractive distillation process and solvents for use therein whereby polyolefin hydrocarbons may be separated from mono-olefin and/or paraffin hydrocarbons and acetylenic hydrocarbons may be separated from polyolefin and/or mono-olefin and/or paraffin hydrocarbons. Additional objects will become apparent from the following description of the invention herein disclosed.

In fulfillment of these and other objects, it has been found that more unsaturated hydrocarbons may be effectively separated from less unsaturated hydrocarbons by a process which comprises contacting a mixture of hydrocarbons of varying degrees of unsaturation with a solvent comprising an alkoxynitrile alone or in admixture with a co-solvent, at elevated temperatures and pressures sufficient to maintain the unabsorbed components of the hydrocarbon mixture in the vapor phase.

Several very distinct advantages are provided by the solvents and the extractive distillation process of the present invention. The solvents of the present invention permit the use of larger quanities of water as a co-solvent as a result of improved water solubility in the alkoxynitrile solvent. Further, the solvents of the present invention possess excellent preferential selectivity as well as high loading capacity for those hydrocarbons for which they have selectivity. In addition, the solvents of the present invention are non-reactive to the more unsaturated hyrocarbons and possess good oxidative and thermal stability. Further, the solvents of the present invention are less corrosive than furfural. Additional advantages obtaining from the present solvents and process will become apparent from the following description of the present invention.

To further describe the present invention, reference is made to the accompanying drawing which presents a schematic presentation of a preferred embodiment of the present invention. Referring to the drawing, a feed mixture containing hydrocarbons of varying degrees of unsaturation is introduced into extractive distillation column 10 by means of line 11. Most often the hydrocarbon feed mixture is introduced in the vapor phase. The alkoxynitrile solvent of the present invention, either alone or with a co-solvent, is introduced into column 10 usually in the liquid phase, through line 12 which is located at a point above line 11. The solvent flows downward through column 10, countercurrently contacting upward flowing vapors of the feed mixture. As the solvent and hydrocarbon feed contact one another, the more unsaturated hydrocarbons are preferentially absorbed. That portion of the feed mixture not absorbed by the solvent passes upward through extractive distillation column 10 and by means of line 13 passes into conduenser 14. In condenser 14, the unabsorbed vapors are condensed and a portion of the condensed material returned to extractive distillation column 10 as reflux by means of a line 15. The remainder of the condensed material is passed from condenser 14 by line 16 to its subsequent utilization. The solvent enriched with absorbed hydrocarbons passes downward through extractive distillation column 10 and is circulated through and heated in reboiler 17 which partially strips absorbed hydrocarbons from the solvent and vaporizes these hydrocarbons which then pass up through column 10. The solvent and absorbed hydrocarbons are removed from extractive distillation column 10 by means of line 18 and are passed to a stripping column 19 in which absorbed hydrocarbons are stripped from the solvent and taken overhead by means of line 20 to their future utility. The stripped solvent passes from stripping column 19 by means of line 21 by which it may be passed back to line 12 as recycle to column 10, or to further processing or other disposition.

If the alkoxynitrile solvents of the present invention are used in combination with water or other co-solvent, it may be necessary to occasionally re-adjust the concentration of the components by removing or adding either water or other co-solvent or the alkoxynitrile. Such treatment is well within the ability of those skilled in the art and will most often take place in conjunction with stripping column 19 or as a separate treatment of the solvent after it has passed from stripping column 19 by means of line 21. In addition, it may be necessary to have more than one stripping column in order to adequately strip the absorbed more unsaturated hydrocarbons from the solvent. Determination of the number and efficiency of stripping columns to adequately purify the solvent of the absorbed more unsaturated hydrocarbons is well within the ability of those skilled in the art.

It will be immediately apparent to those skilled in the art that many modifications of the above-described method for carrying out the present invention may be made. So long as the modification requires the solvents of the present invention as well as the process conditions hereinafter disclosed, said modifications are within the spirit and scope of the present invention.

In order to further describe and to illustrate the present invention, the following examples are presented. These examples are in no manner to be construed as limiting the present invention.

*Example I*

A hydrocarbon mixture consisting of approximately 37.0 mole percent butadiene, 7.6 mole percent cis-butene-2, 6.5 mole percent trans-butene-2, 32.0 mole percent isobutene, 11.0 mole percent butene-1, 3.2 mole percent n-butane and 2.7 mole percent isobutane was placed in a distillation unit of approximately one theoretical plate efficiency. To this was added an amount of a solvent composition consisting of 94.9 percent by weight of 3 - methoxypropionitrile and 5.1 percent by weight of water sufficient to produce a weight ratio of solvent to hydrocarbon mixture of approximately 4:1. The resulting solvent-hydrocarbon mixture was heated to a temperature of about 130° F. and increased to a pressure of 59 p.s.i.g. at which temperature and pressure it was refluxed for about 2 hours. At the end of the 2 hours, the vapor and liquid phases were sampled and analyzed. The vapor phase was found to have a composition of approximately 28.5 percent by weight butadiene 4.8 percent cis-butene-2, 7.1 percent by weight trans-butene-2, 50.1 percent by weight of butene-1 and isobutene combined, 4.9 percent by weight of n-butane and 4.6 percent by weight of isobutane. The portion of the hydrocarbon mixture absorbed by the solvent was found to consist of 39.9 percent by weight butadiene, 5.3 percent by weight cis-butene-2, 6.7 percent trans-butene-2, 43.2 percent by weight butene-1 and isobutene combined, 2.9 percent by weight of n-butane and 2.0 percent by weight of isobutane. The weight percent of hydrocarbons absorbed by the solvent was 18.7 which represented a solvent loading of 23.1 pounds of hydrocarbons per 100 pounds of solvent.

*Example II*

To demonstrate the advantages to be obtained from the extractive distillation process and the solvents of the present invention, the hydrocarbon mixture of Example I was subjected to extractive distillation using a solvent system consisting of 95 percent by weight furfural and 5 percent by weight water. The conditions of the extractive distillation were the same as that of Example I with the exception that the pressure was 65 p.s.i.g. and the solvent to hydrocarbon ratio was 4.1:1. Vapor and liquid samples were obtained after 2 hours. The vapor sample was found to consist of 26.9 percent by weight butadiene, 5.0 percent by weight cis-butene-2, 7.3 percent by weight trans-butene-2, 48.7 percent by weight of butene-1 and isobutene, 6.4 percent by weight of n-butane and 5.7 percent by weight of isobutane. The hydrocarbon mixture absorbed by the furfural-water solvent system consisted of 35.8 percent by weight butadiene, 6.0 percent by weight cis-butene-2, 8.0 percent by weight trans-butene-2, 43.0 percent by weight of butene-1 and isobutene, 4.5 percent by weight of n-butane and 2.7 percent by weight of isobutane. The weight percent of hydrocarbons absorbed by the solvent system was 18.0 which represented a solvent loading of 25.0 pounds of hydrocarbons per 100 pounds of solvent.

As an index of comparison of the selectivity of the solvent systems of Examples I and II, the relative volatilities of trans-butene-2 and butadiene in the feed mixture of Example I and in the precence of the solvent systems of Examples I and II were calculated. Relative volatility is obtained by the following equation:

$$\text{Relative volatility} = \frac{A/B}{C/D}$$

wherein A is the mole percent trans-butene-2 in the vapor phase, B is the mole percent trans-butene-2 in the liquid phase, C is the mole percent butadiene in the vapor phase and D is the mole percent butadiene in the liquid phase. The relative volatility for trans-butene-2 in the above-defined hydrocarbon mixture in the absence of a solvent was 0.843. The relative volatility with the solvent system of Example I is 1.489, while the relative volatility with the conventional furfural-water system of Example II was 1.200.

*Example III*

To further demonstrate the superiority of the extractive distillation process and solvent system of the present invention, furfural, acetonitrile and 3-methoxypropionitrile, each containing 5 percent by weight water as co-solvent, were compared in three extractive distillations carried out at lower temperatures and at higher pressures. The vapor and liquid phases were sampled as in Examples I and II and the solvent loading and relative volatility of trans-butene-2 and butadiene obtained with each of the solvent systems. The following table summarizes the operating conditions of the extractive distillations and the results obtained therefrom.

|  | Furfural-H$_2$O | Acetonitrile-H$_2$O | 3-methoxypropionitrile-H$_2$O |
| --- | --- | --- | --- |
| Temp., °C | 71.1 | 71.1 | 71.1 |
| Pressure (p.s.i.g.) | 81.0 | 82.5 | 83.0 |
| Solvent to Hydrocarbon Ratio, wt | 5.8:1 | 3.3:1 | 4.5:1 |
| Solvent loading, lbs./100 lbs. solvent | 15.0 | 28.7 | 20.6 |
| Relative Volatility | 1.247 | 1.329 | 1.453 |

From the above comparisons, it is apparent that the solvent system of the present invention possesses substantially improved selectivity over the two conventional solvents. In addition, the solvent of the present invention possesses a greater loading capacity than does the conventional furfural-water solvent system under the conditions of these extractive distillation runs.

Example IV

The hydrocarbon mixture of Example I was subjected to extractive distillation with 3-methoxypropionitrile at a solvent to feed ratio of 3:1, a temperature of 60° C. and a pressure of 70 p.s.i.g. in a distillation unit of approximately one theoretical plate efficiency. The weight percent hydrocarbons absorbed by the solvent was 26.5 loading and relative volatility, as defined above, were obtained for this extractive distillation run. The weight percent hydrocarbons absorbed by the solvent was 26.5 which represents a solvent loading of 27.8 pounds of hydrocarbons per 100 pounds of solvent. Relative volatility of trans-butene-2 and butadiene was found to be 1.325.

Example V

The present invention is further illustrated by a series of extractive distillation runs wherein 3-ethoxypropionitrile alone and with 5 to 10 percent by weight of water was used as solvents for the separation of mixtures of butadiene-1,3 and trans-butene-2, mixtures of propylene and propadiene and mixtures of hexenes and hexadienes. In each of the extractive distillation runs, the overhead distillate is found to contain a substantially higher concentration of the less unsaturated component of the mixture than is initially present in the mixture. Further, in each instance, good solvent loading is obtained.

Example VI

A two-inch diameter Oldershaw fractionating column of approximately 145 trays is employed in separating a hydrocarbon mixture of substantially the same composition as the mixture of Example I. The hydrocarbon mixture is introduced into the Oldershaw column at a point 72 trays from the bottom of the column at a rate of 240 grams per hour. A solvent system comprised of 95 percent by weight 3-methoxypropionitrile and 5 percent by weight water is introduced into the fractionating column at a point 140 trays from the bottom of the column at a rate such as to cause a 10:1 solvent to feed weight ratio. The column is operated with a 3.2 reflux ratio (wt. reflux to wt. of raffinate feed). The distillate obtained overhead is substantially free of butadiene. The solvent-butadiene mixture is continuously taken from the bottom of the column and subjected to distillation from which the butadiene is obtained in a concentration of approximately 91 percent, the balance consisting essentially of cis-butene-2 which may be subsequently separated from the butadiene by fractionation.

The solvents of the present invention are alkoxynitriles. These alkoxynitriles generally have the formula

R—O—R—C—N wherein R is an alkyl radical. Most often, these alkyl radicals contain no greater than 5 carbon atoms. Usually, however, the alkyl radicals contain no greater than 3 carbon atoms. These alkyl radicals may be either straight-chain or branched-chain. The preferred alkoxynitriles for the practice of the present invention are those wherein R is a straight-chain alkyl radical of 1 to 3 carbon atoms. Included within this preferred group are such compounds as 3-methoxyacetonitrile, 3-ethoxyacetonitrile, 3-propoxyacetonitrile, 3-methoxypropionitrile, 3-ethoxypropionitrile, 3-propoxypropionitrile, 4-methoxybutyronitrile, 4-ethoxybutyronitrile and 4-propoxybutyronitrile. The most preferred of the alkoxynitrile solvents are 3-methoxypropionitrile and 3-ethoxypropionitrile.

The solvents of the present invention may be used alone or in combiantion with other co-solvents. In fact, the above-described solvents are preferably used with 1 to 25 percent by weight water as a co-solvent. A particularly useful solvent system for the practice of the present invention is one having a composition of 85 to 95 percent by weight of the alkoxynitrile and 5 to 15 percent by weight of water.

Any conventional distillation equipment may be used in practicing the invention herein disclosed. The present invention may be carried out either by batch distillation as illustrated in Examples I and II, or as a continuous distillation as is illustrated by Example VI. Any conventional fractionating equipment may be used. The fractionation unit may be a packed column or it may be a column equipped with perforated plates, bubble trays or a system of baffles. The number of theoretical plates in the fractionating unit will depend upon the efficiency of separation desired, the precise composition of the feed mixture, the quantity of solvent, the reflux ratio and other related factors well known to those skilled in the art. The theoretical plate efficiency may be as low as 1 as illustrated in Examples I and II, or may be as high as 150 and higher. The preferred fractionating column is one providing for countercurrent vapor liquid contact under reboiling and refluxing conditions and generally will have a theoretical plate efficiency of 25 to 150.

In practicing the present invention according to its preferred mode of practice, the feed mixture is introduced into the fractionating column at a point approximate to or below the mid-point of the column while the solvent is introduced at a point above the entry point of the feed mixture. The solvent most often is introduced into the extractive distillation column at a point at or near the top of the column. Generally, it will be preferred that the feed mixture be introduced at a point in the fractionating column of from ½ to ⅗ of the height of the column from the bottom of the column and that the solvent be introduced at a point no greater than ⅓ of the height of the column as measured from the top of the column.

The quantity of solvent used in practicing the present invention will vary to some extent depending upon the degree of separation desired, the compounds to be separated, the efficiency and conditions of the extractive distillation and the separation equipment. Generally, however, the solvent to feed weight ratio will be within the range of about 0.5:1 to about 20:1. However, both lower and higher ratios may be used if desired. Preferably, the solvent to feed weight ratio will be within the range of about 1:1 to 10:1.

The reflux ratio at which the column is operated will vary according to the theoretical plate efficiency of the column, the solvent to feed ratio, composition of the feed mixture and the separation desired. Generally, however, reflux ratios of 0.01:1 to 20:1 will suffice. It is preferred, however, that the reflux ratio be within the range of 0.5:1 to 5:1.

The present extractive distillation process may be carried out at atmospheric pressure or at subatmospheric pressures as well as at superatmospheric pressures. Generally, pressures within the range of from atmospheric to 200 p.s.i.g. will be used. Preferably, however, the pressure will be within the range of from approximately 40 to 90 p.s.i.g.

The temperatures at which the present extractive distillation process may be operated will vary quite widely depending upon the hydrocarbon mixture being separated. Generally, in the usual practice of the present invention, temperatures within the range of 0 to 400° F. will be employed. However, the temperatures optimum for separating, for example a $C_3$ hydrocarbon mixture, are substantially different from those optimum for a $C_7$ hydrocarbon mixture. Optimum temperatures may be readily determined by those skilled in the art having the present teachings before them. When the present invention is utilized in accordance with the particularly preferred utility hereinafter defined, temperatures of 50 to 300° F. are commonly employed.

The present invention is primarily directed to the separation of less unsaturated hydrocarbons from more unsaturated hydrocarbons. According to the present invention, mono-olefins may be separated from paraffins, diolefins, triolefins, acetylenes, etc., diolefins may be separated from paraffins, mono-olefins, triolefins, acetylenes, etc. Usually, the hydrocarbon mixtures separated according to the present extractive distillation process are comprised primarily of hydrocarbons having no greater than 7 carbon atoms per molecule. In the preferred practice, the present invention finds its greatest utility in the separation of hydrocarbon mixtures comprised of hydrocarbons of varying degrees of unsaturation and having 3 to 5 carbon atoms per molecule. In the particularly preferred practice of the present invention, the present invention is used for the separation of diolefinic hydrocarbons of 3 to 5 carbon atoms from mono-olefinic and paraffinic hydrocarbons of 3 to 5 carbon atoms.

The more unsaturated hydrocarbons absorbed by the solvent composition of the present invention may be recovered from the solvent by any of the means well known to the art. These absorbed hydrocarbons may be removed from the solvent by flash distillation, by fractionation, by stripping with a gas or any other conventional means.

What is claimed is:

1. A process for the separation of mixtures of hydrocarbons of varying degrees of unsaturation which comprises extractively distilling said mixtures of hydrocarbons at a temperature within the range of 0 to 400° F. and a pressure within the range of atmospheric to 200 p.s.i.g. in the presence of a solvent consisting essentially of 75 to 99 percent of an alkoxynitrile in which the alkyl radicals are straight chain and have one to three carbon atoms, and 1 to 25 percent by weight of water, recovering an overhead distillate fraction from said distillation substantially richer in hydrocarbons of a lesser degree of unsaturation than said original mixture, removing the solvent fraction rich in the more unsaturated hydrocarbons of said mixture from said distillation and recovering from said solvent fraction a fraction substantially richer in said more unsaturated hydrocarbons.

2. The process of claim 1 wherein the weight ratio of solvent to feed is at least 0.5:1.

3. The process of claim 1 wherein the mixture of hydrocarbons of varying degrees of unsaturation contains hydrocarbons having no greater than 7 carbon atoms per molecule.

4. The process of claim 1 wherein the extractive distillation is carried out at a pressure within the range of 40 to 90 p.s.i.g.

5. The process of claim 1 wherein the extractive distillation is carried out at a temperature within the range of 50 to 300° F.

6. The process of claim 1 wherein the solvent is one comprised of 85 to 95 percent by weight of an alkoxynitrile and 5 to 15 percent by weight of water.

7. The process of claim 1 wherein the alkoxynitrile is one selected from the group consisting of 3-methoxypropionitrile and 3-ethoxypropionitrile.

8. The process of claim 1 wherein said mixtures of hydrocarbons are continuously introduced into an intermediate section of a fractionating column and said solvent is continuously introduced into said fractionating column at a point above the point of introduction of said mixture so that said solvent flows countercurrent to and intimately contacts the ascending vapors of said mixture, and a hydrocarbon fraction substantially richer in hydrocarbons of a lesser degree of unsaturation than said mixture is continuously withdrawn as an overhead from said column and a solvent fraction rich in the more unsaturated hydrocarbons of said mixture is continuously removed from the bottom of said column.

References Cited
UNITED STATES PATENTS

| | | | |
|---|---|---|---|
| 2,433,751 | 12/1947 | Friedman | 208—330 |
| 2,441,827 | 5/1948 | McKinnis | 208—313 |
| 2,842,484 | 7/1958 | Fleck | 208—330 |

HERBERT LEVINE, *Primary Examiner.*